(12) United States Patent
Cote (10) Patent No.: US 10,531,644 B2
(45) Date of Patent: Jan. 14, 2020

(54) SUET FEEDER

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 210 days.

(21) Appl. No.: 15/330,906

(22) Filed: Nov. 14, 2016

(65) Prior Publication Data

US 2017/0164585 A1    Jun. 15, 2017

(30) Foreign Application Priority Data

Nov. 16, 2015 (CA) ...................... 2912149

(51) Int. Cl.
*A01K 39/01* (2006.01)

(52) U.S. Cl.
CPC ...... *A01K 39/0106* (2013.01); *A01K 39/0113* (2013.01)

(58) Field of Classification Search
CPC . A01K 5/015; A01K 39/0106; A01K 39/0113
USPC ...................... 119/51.03, 52.3, 52.4, 53, 57.9
See application file for complete search history.

(56) References Cited

U.S. PATENT DOCUMENTS

| | | | | |
|---|---|---|---|---|
| 485,328 A * | 11/1892 | Lee | ......................... | A01K 5/015 119/51.03 |
| 2,504,282 A * | 4/1950 | Tobias | ............... | A01K 39/0106 119/51.03 |
| 2,518,549 A * | 8/1950 | Hyde | ................. | A01K 39/0106 119/464 |
| 6,581,540 B1 * | 6/2003 | LaVanish | ............. | A01K 39/012 119/51.01 |
| 8,794,184 B2 * | 8/2014 | Cote | ................... | A01K 39/0113 119/52.3 |
| 2004/0123808 A1 * | 7/2004 | Dunn | ................. | A01K 39/0113 119/57.9 |
| 2004/0194727 A1 * | 10/2004 | Conway | ............. | A01K 39/0106 119/600 |
| 2007/0084412 A1 * | 4/2007 | Eager | ................. | A01K 39/0106 119/51.03 |
| 2008/0053378 A1 * | 3/2008 | Willinger | ........... | A01K 39/0106 119/468 |
| 2013/0334269 A1 * | 12/2013 | Cardonna | ................. | B60R 7/08 224/554 |
| 2014/0060438 A1 * | 3/2014 | Cote | ................... | A01K 39/0113 119/51.01 |

* cited by examiner

*Primary Examiner* — Lisa L Tsang (57) ABSTRACT

A suet feeder which comprises an inner frame, a tray sized to receive a suet pack, the tray being slidably mounted on the frame, a suet support member which is mounted on the frame, the tray being slidable past the suet support member, and a shroud extending over the frame and tray and suet support member, the shroud having a wall which extends over the tray and suet support member, the wall having a feed opening therein with a relatively closed area of the shroud being located above the feed opening, the arrangement being such that the feed opening is normally located proximate an upper portion of the suet support member such that access may be had to a lower portion of a suet pack mounted on the suet support member.

13 Claims, 14 Drawing Sheets

SUET FEEDER

FIELD OF THE INVENTION

The present invention relates to a suet feeder and more particularly, relates to a suet feeder having a slidable tray for supporting the suet in a desired position.

BACKGROUND OF THE INVENTION

Suet feeders for feeding birds are well known in the art and used extensively. Although some people will make their own suet and hang it out on a piece of string or supported in a different fashion, most people cannot be bothered to do so. Knowingly, there is a substantial market for prepackaged suet. Typically, the prepackaged suet comes in a plastic container with a layer of flexible plastic material sealed thereover to enclose the suet.

In order to accommodate this prepackaged suet, various simple feeders have been utilized. In particular, a popular arrangement is the use of a woven metallic wire cage to which a hanger is attached. In order to utilize the metal cage, one removes the suet from the package and inserts it into the metal cage, closes the same and it is hung from a suitable hook or the like. Birds can access the suet through the openings between the wires.

Such an arrangement is useful in that it provides a suet feeder which is inexpensive. However, a problem associated with the metal cages is the mess which typically occurs when one grips the open package by hand, since the work with the hand would tend to melt the fat component of the suet.

A further disadvantage of such an arrangement is that the suet is frequently eaten by undesired marauders such as squirrels. One or two squirrels can easily eat the contents of a single suet package.

A different approach to this problem is shown in U.S. Pat. No. 8,794,184, the teachings of which are hereby incorporated by reference. This patent shows a suet feeder which encloses the suet package within a housing and shroud. The shroud provides a number of access openings to the suet package. While the arrangement shown therein provides a reasonably squirrel proof arrangement, the stationary suet package is susceptible to only partially being eaten with a fair degree of waste. In other words the suet which is not directly accessible from the suet access openings has not yet been eaten. The birds can eat only straight ahead and do not angle upwardly or downwardly to gain access to the suet.

A further problem with the arrangement as shown in U.S. Pat. No. 8,794,184 is that manual handling of the suet package is generally required and for many people this is disagreeable.

SUMMARY OF THE INVENTION

It is an object of the present invention to provide a suet feeder wherein the suet does not require handling.

It is a further object of the present invention to provide a squirrel proof feeder wherein a sliding tray arrangement is employed to ensure that all the suet is consumed.

According to an embodiment of the present invention, there is provided a suet feeder comprising an inner frame, a tray sized to receive a suet pack, the tray being slidably mounted on the frame, a suet support member mounted on the frame, the tray being slidable past the suet support member, a shroud extending over the frame and the tray and suet support member, the shroud having a wall extending over the tray and suet support member, the wall having a feed opening therein, a relatively closed area of the shroud being located above the feed opening, the feed opening being located proximate an upper portion of the suet support member such that access may be had to a lower portion of a suet pack on the suet support member.

The suet feeder of the present invention, in a preferred embodiment, can accept two suet packages. To do so, the suet feeder is symmetrical about a plane which extends through and is parallel to the surface of the back wall.

The arrangement is such that a standard suet pack (typically rectangular in configuration) is placed in a tray which is movable within the suet feeder. Initially, a bottom portion of the suet pack is presented to the feed access opening. As the suet is consumed by the birds, the tray is free to move downwardly while a suet support member will continue to support the suet pack as the lower portion is consumed.

The suet feeder is equipped with a shroud which is designed to render the suet feeder squirrel proof. As soon as any weight is placed on the shroud or attached cover, the shroud will move downwardly to cover the suet. The portion of the shroud moving downwardly comprises a relatively closed area such that a squirrel or other marauder cannot access the suet.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Referring to the drawings in greater detail and by reference characters thereto, there is illustrated a suet feeder which is generally designated by reference numeral 10.

Suet feeder 10 includes a frame 12 which has a center wall 14 with rectangular apertures 16 formed therein. Center wall 14 terminates in side walls 18, 20. There is also provided a top wall 22 and a bottom wall 24 having apertures 26 to permit drainage therefrom.

As will be seen from the description hereinbelow, suet feeder 10 is substantially symmetrical about a plane extending through the middle of center wall 14 and is also symmetrical about a plane extending perpendicularly to the middle of center wall 14. The suet feeder 10 is designed to accept two suet packages, one on either side of center wall 14. However, it will be understood that suet feeder 10 could be designed to accept only a single suet pack.

Extending outwardly from side wall 18 are flanges 28 and 30. It will be noted that flanges 28 and 30 extend outwardly only for a portion of the length of side wall 18. Similarly, side wall 20 also includes a pair of flanges also extending outwardly only for a portion of the length of side wall 20.

Side wall 18 includes a mounting structure generally designated by reference numeral 34 while side wall 20 includes a mounting structure generally designated by reference numeral 36. Mounting structures 34 and 36 are identical and only one will be described herein. Identical reference numerals are utilized herein for both mounting structures.

Mounting structure 34 includes a pair of ears 38, 40 extending outwardly from side wall 18. Extending between ears 38, 40 is a center element 42.

A pair of suet support members are generally designated by reference numeral 44 and are pivotably connected to mounting structures 34, 36. Suet support members 44 both utilize identical reference numerals and they include a pair of pivot elements 46. Each pivot element 46 includes a pair of flanges 48 each terminating in an end piece 50. A pin 52 is used to interconnect end piece 50 and ears 38, 40 such that suet support members 44 can pivot for reasons which will become apparent hereinbelow.

Each support member 44 further includes a center support 54 for supporting suet as will be shown hereinbelow. An end piece 56 has catches 58 which are designed to engage with center element 42 so as to maintain suet support member 44 in a closed position.

Suet feeder 10 includes a tray 60. Tray 60 has an end wall 62 and opposed side walls 64, 66. End wall 62 includes end wall catches 68. Each side wall 64, 66 includes an outwardly extending flange 70 which is continuous with a downwardly extending side wall 72. From side wall 72, there are provided a plurality of inwardly extending tabs 74. Flange 70, side wall 72 and tabs 74 form a channel which is designed to engage with flanges 28, 30 such that tray 60 can move therealong.

Figure 1:
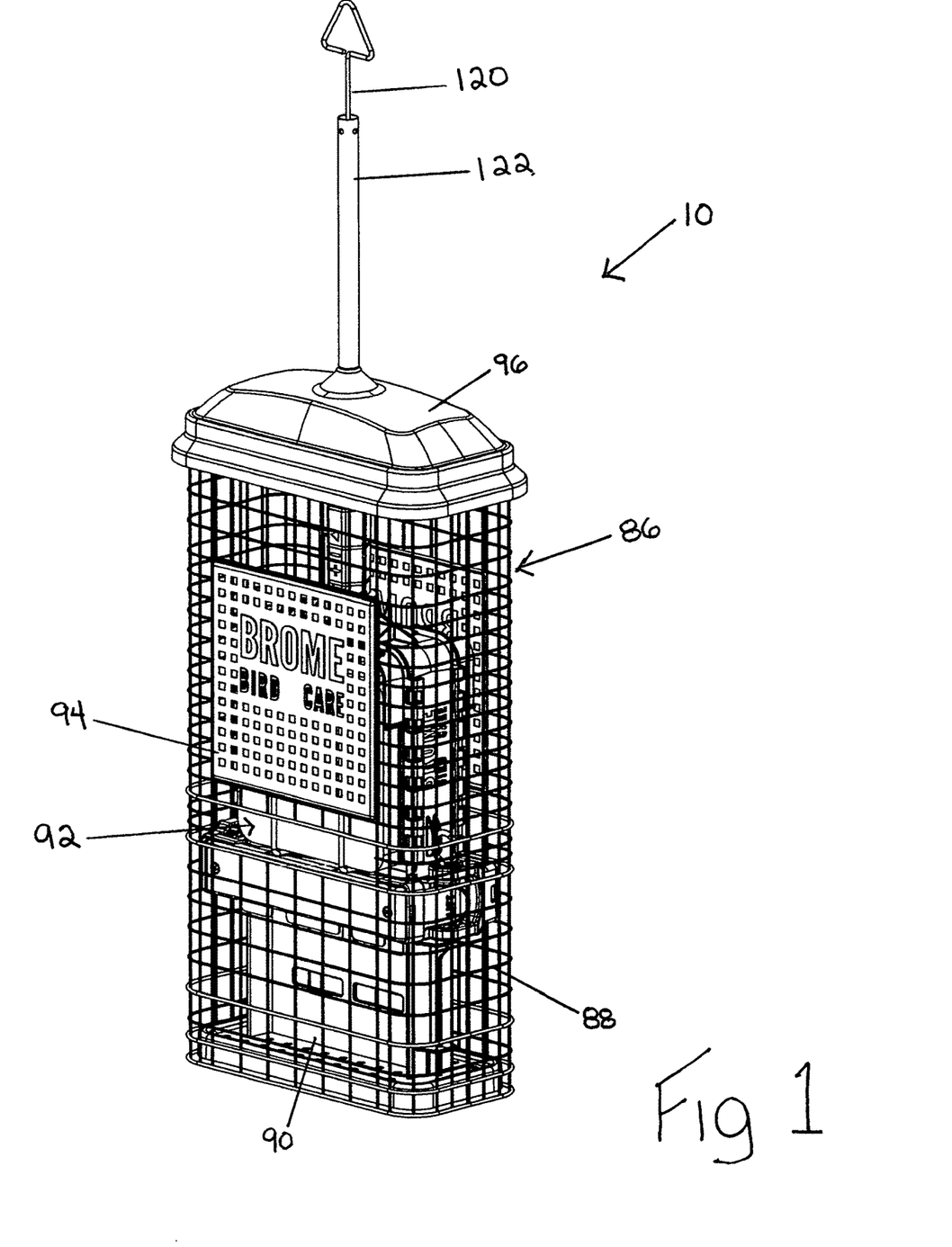
FIG. 1 is a perspective view of a suet feeder according to an embodiment of the present invention.
Figure 2:
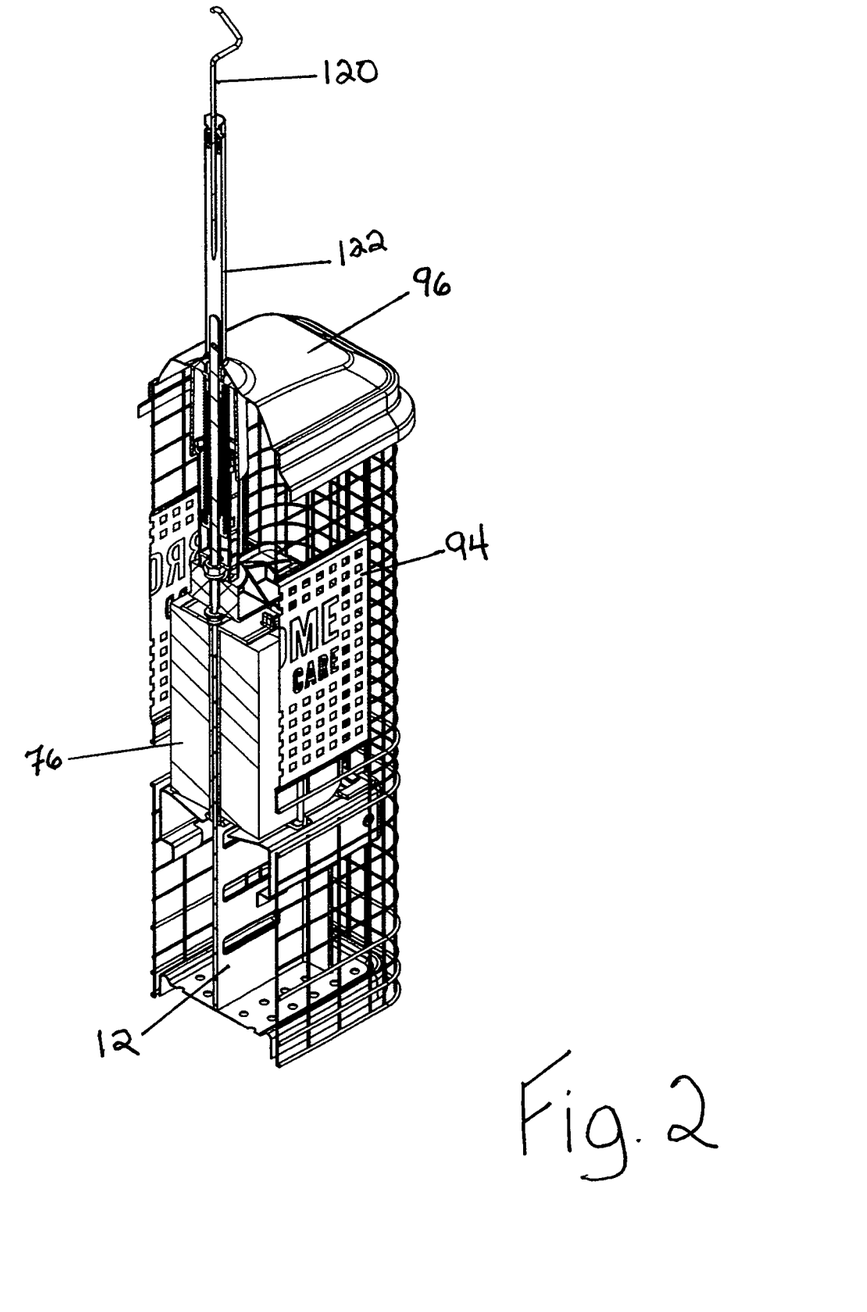
FIG. 2 is a perspective cross-sectional view of the suet feeder of FIG. 1.
Figure 3:
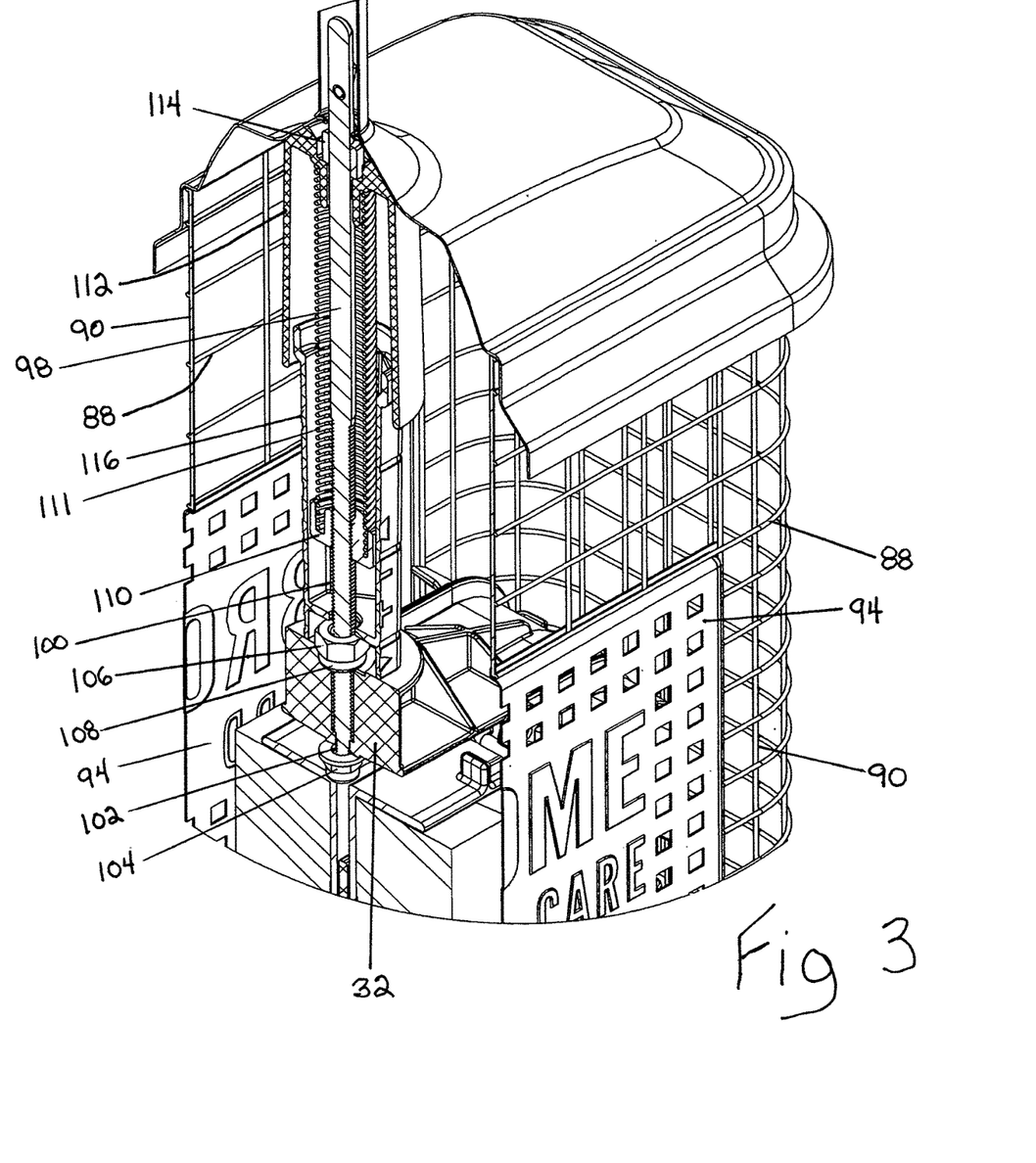
FIG. 3 is a perspective cross-sectional view of the upper portion of the suet feeder of FIG. 2.
Figure 4:
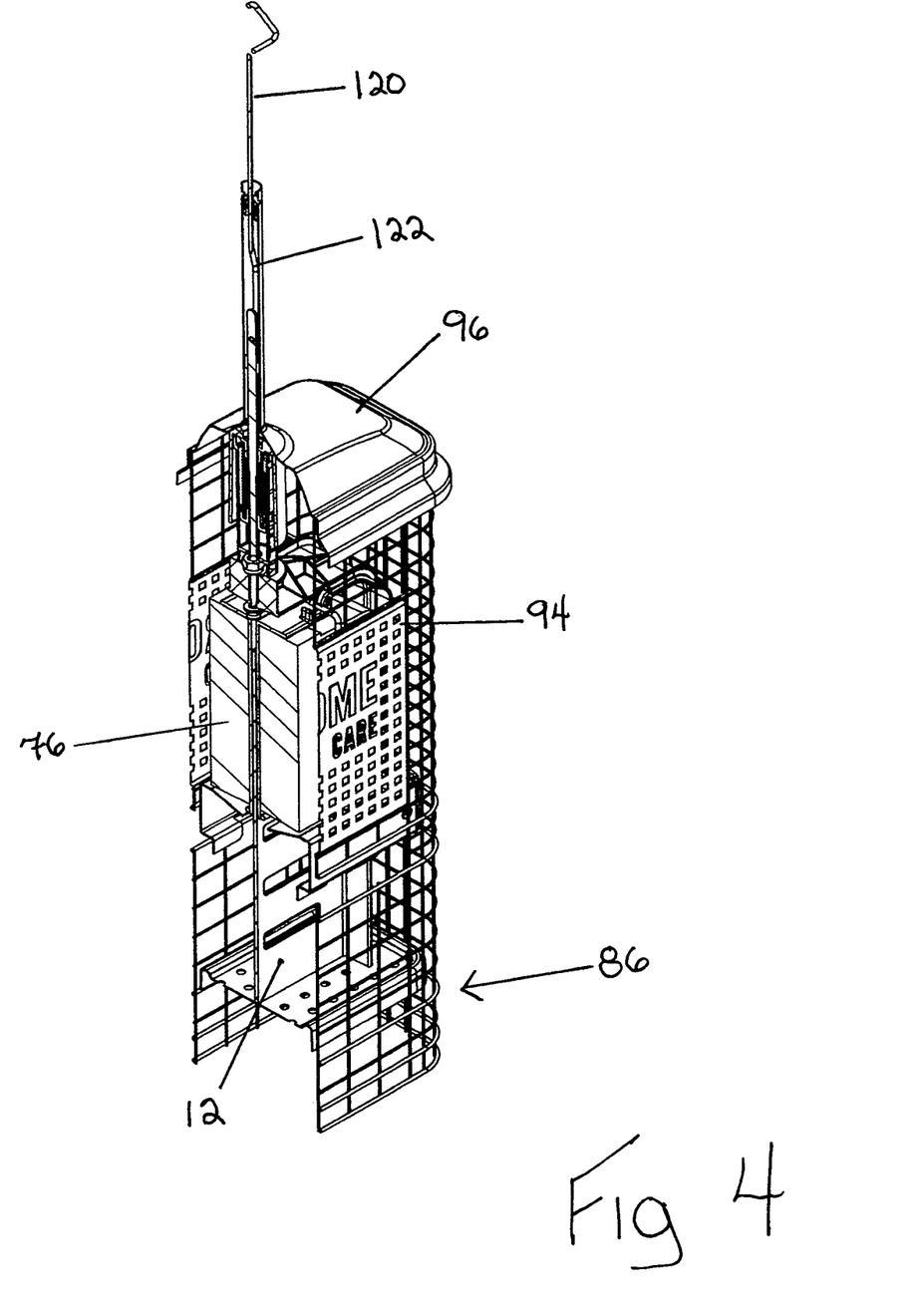
FIG. 4 is a perspective cross-sectional view similar to FIG. 2 illustrating when the spring has been compressed and the shroud moved to deny access to the suet.
Figure 5:
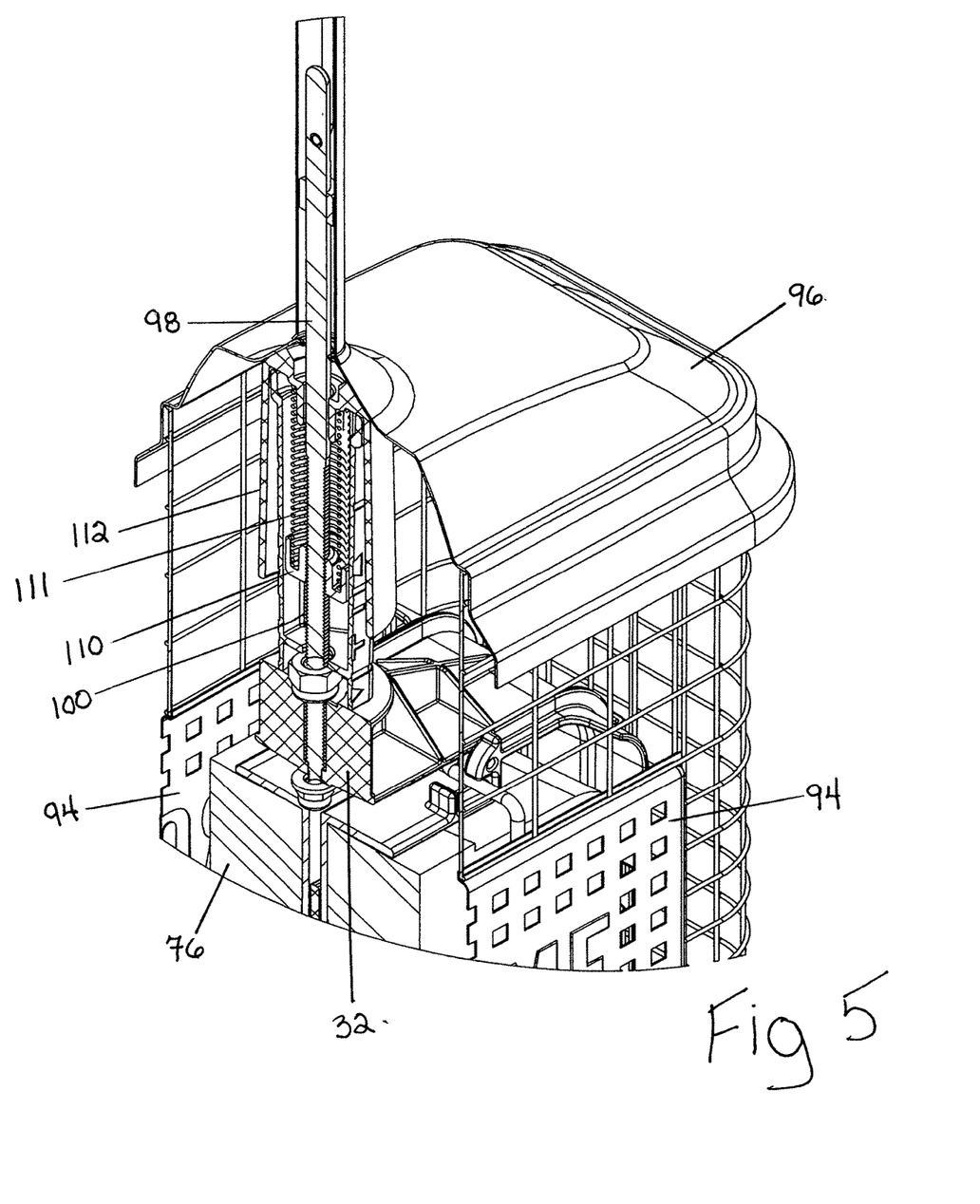
FIG. 5 is an expanded perspective cross-sectional view of the upper portion of the feeder of FIG. 4.
Figure 6:
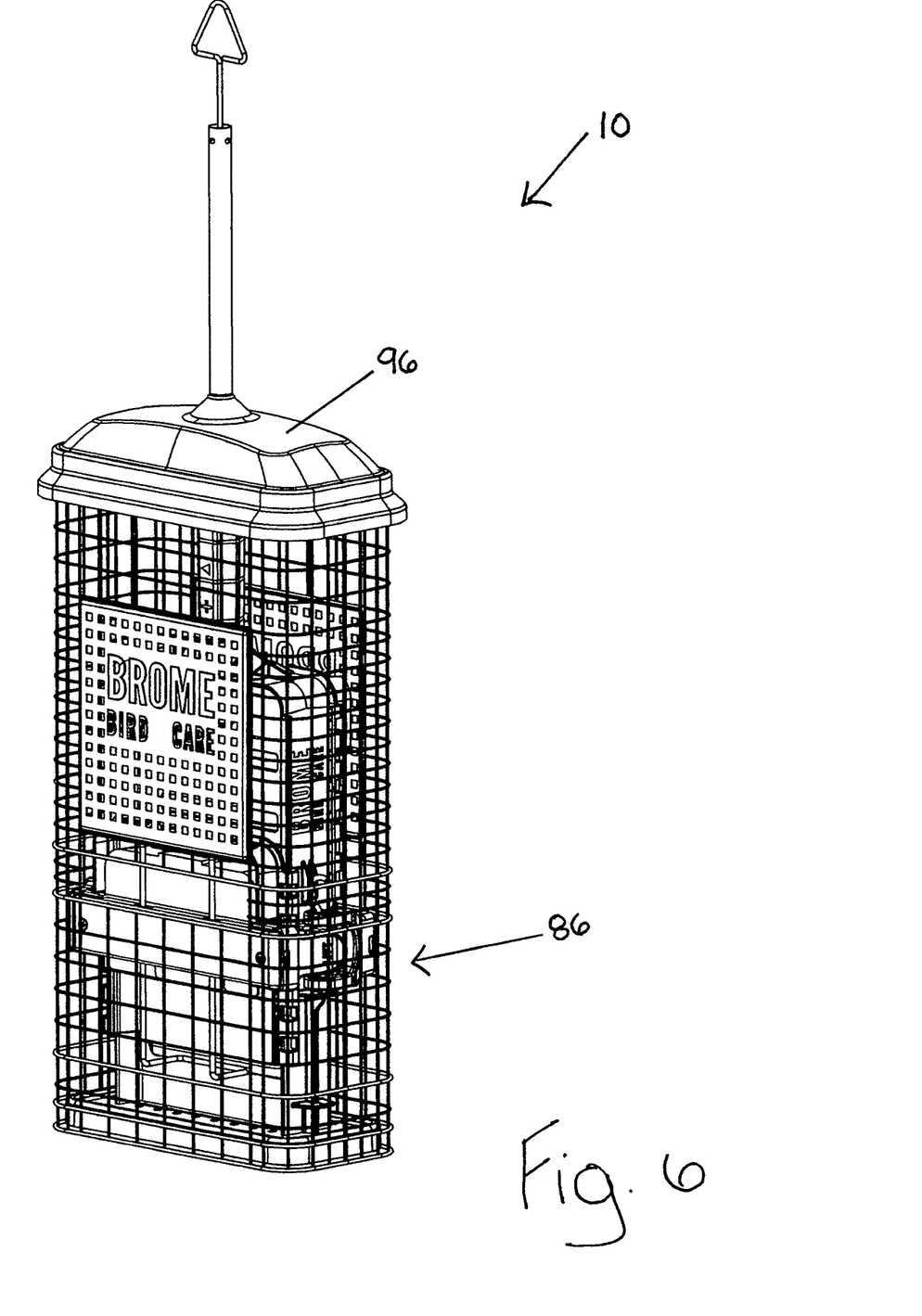
FIG. 6 is a perspective view of the suet feeder.
Figure 7:
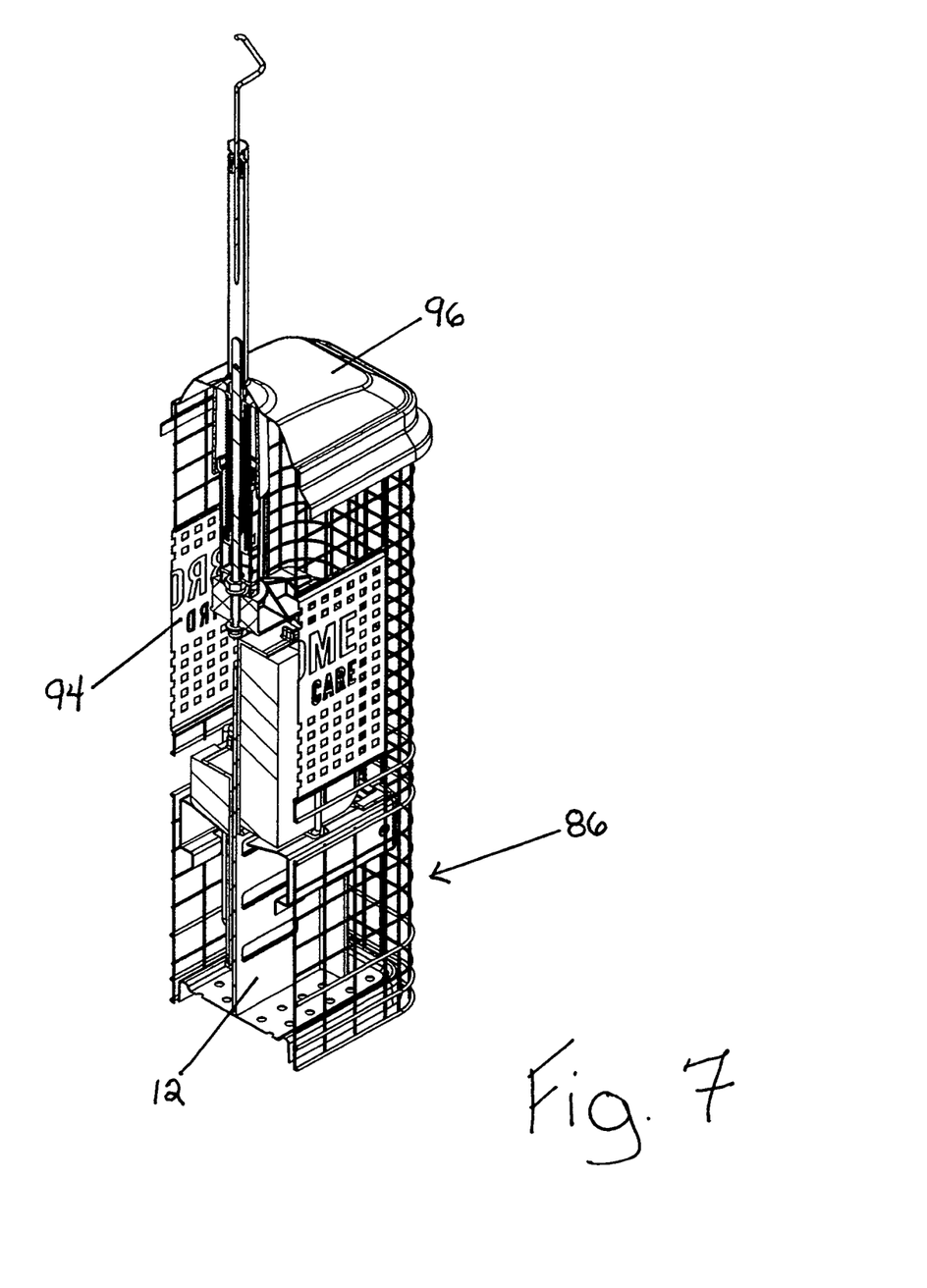
FIG. 7 is a perspective sectional view of the feeder where the spring is not compressed and access may be had to the suet.
Figure 8:
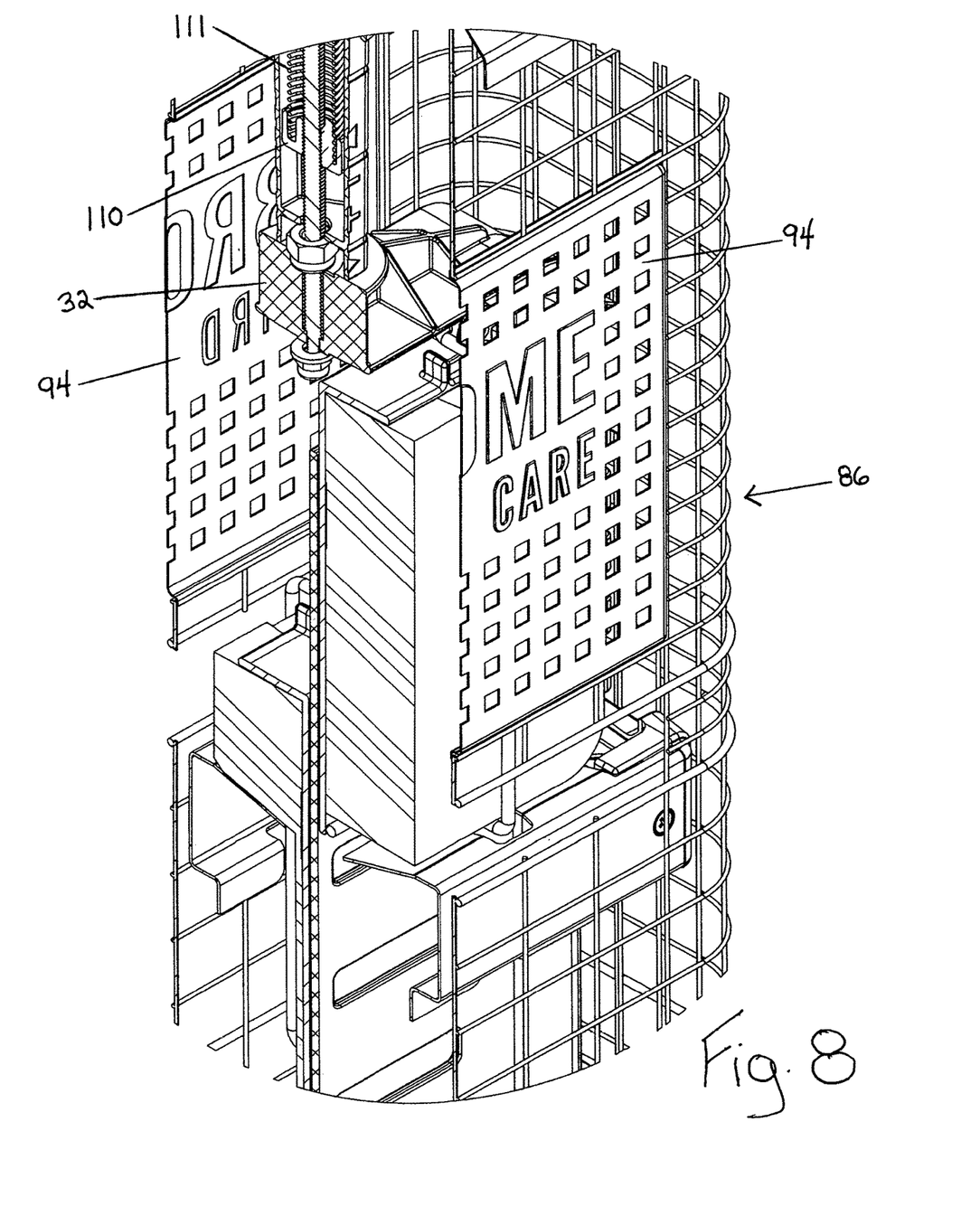
FIG. 8 is an expanded perspective cross-sectional view of the upper portion of the suet feeder of FIG. 7.
Figure 9:
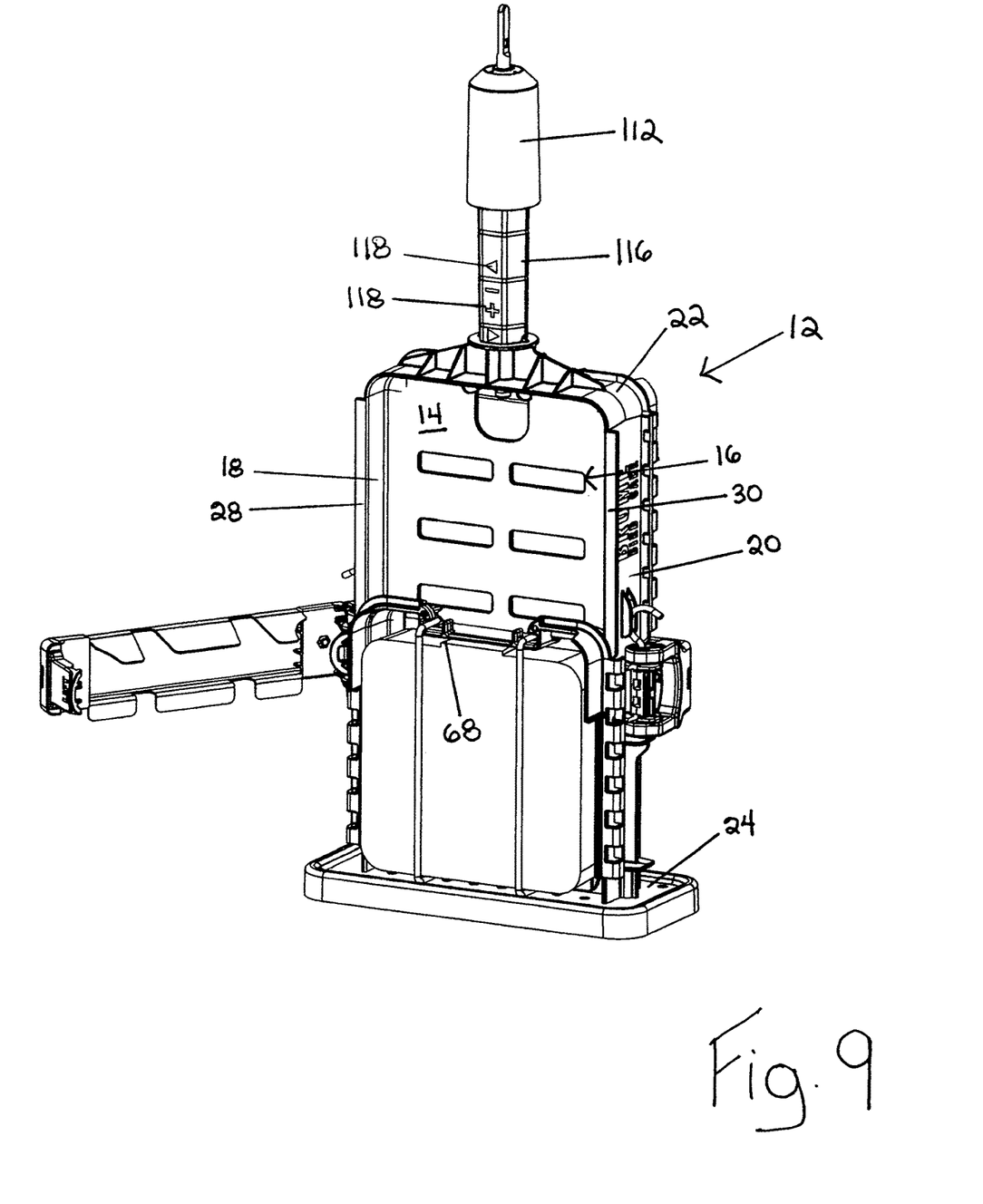
FIG. 9 is a perspective view showing the inner frame and a suet pack upon initial insertion of the suet pack therein.
Figure 10:
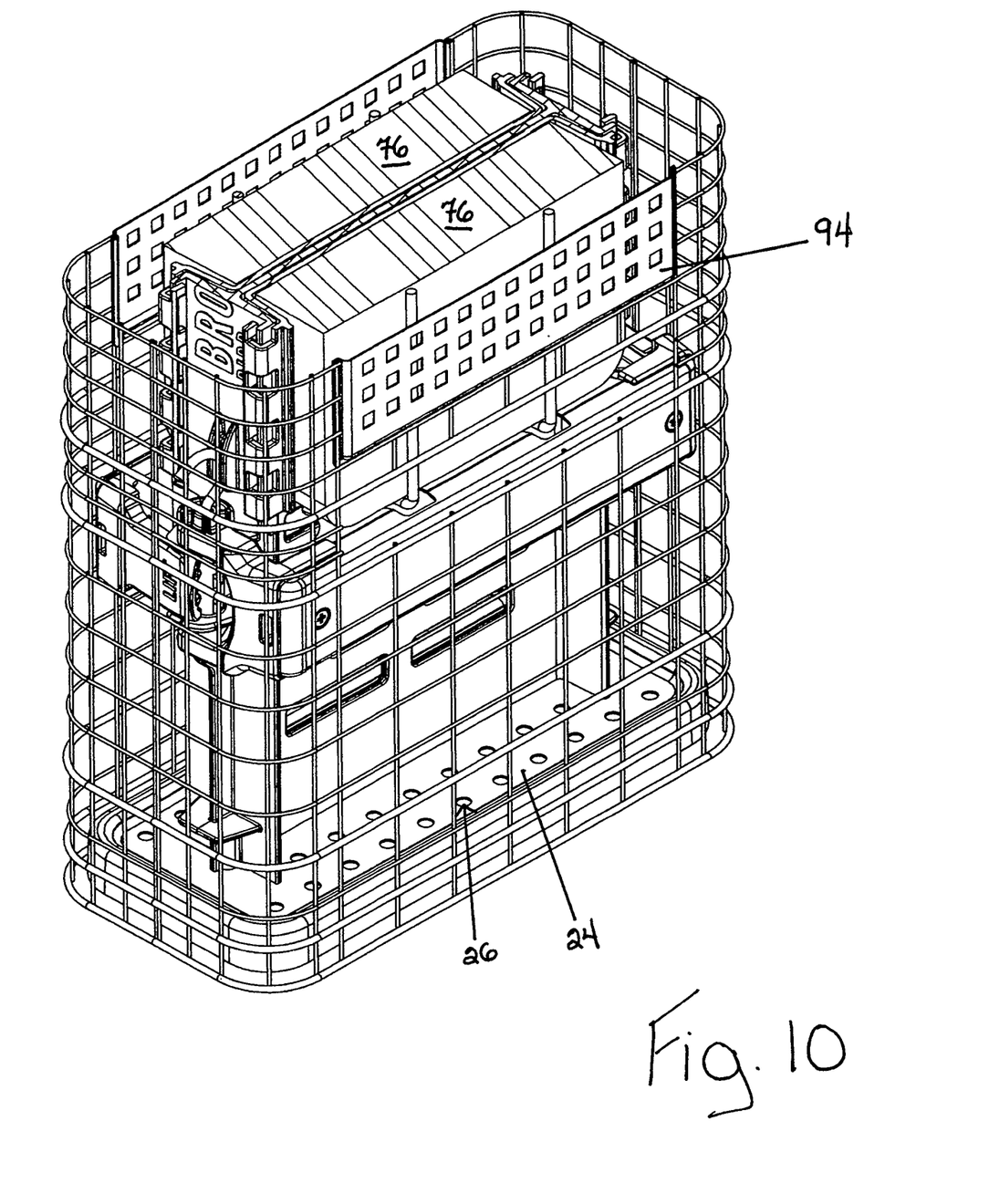
FIG. 10 is a perspective expanded view of the lower portion of the suet feeder.
Figure 11:
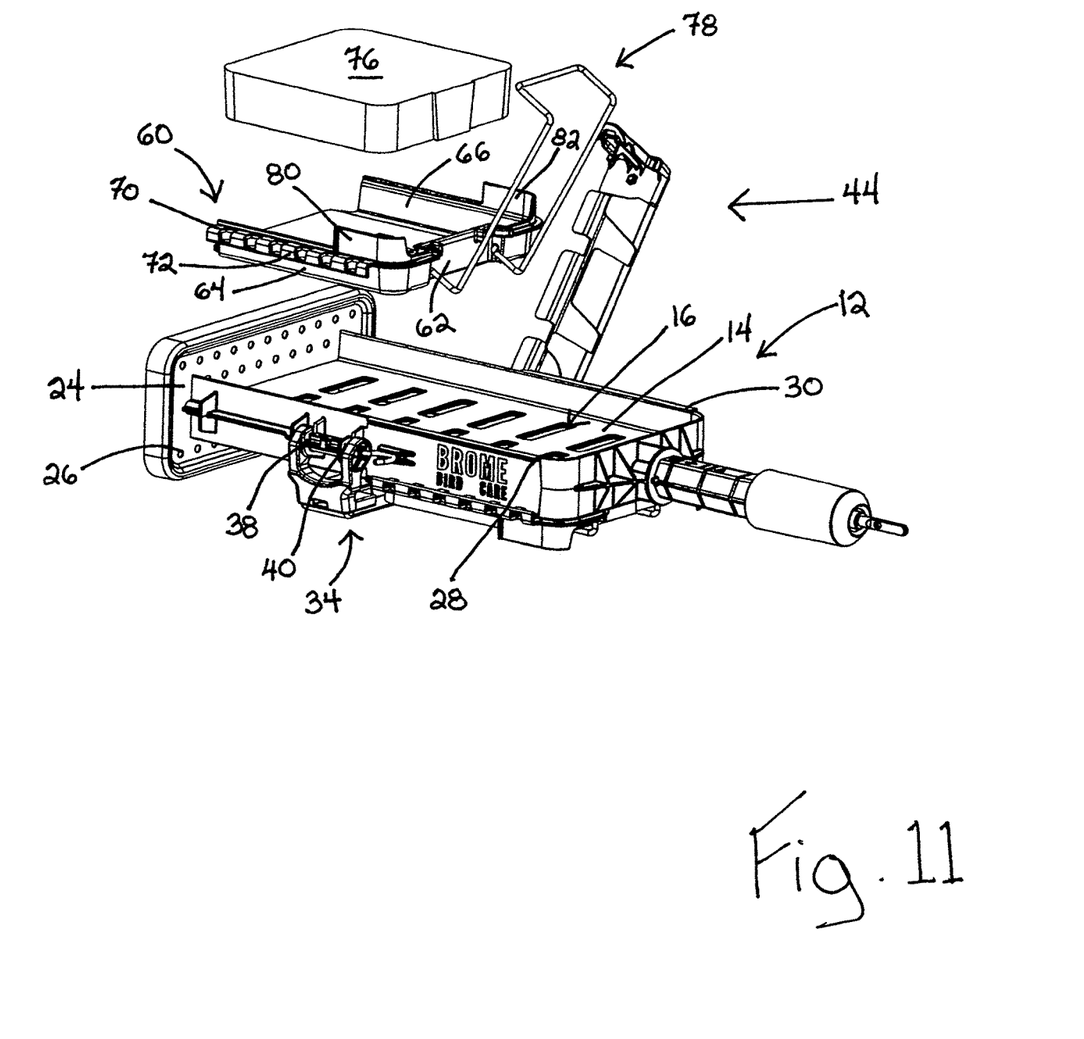
FIG. 11 is an exploded view illustrating placement of the suet pack in the feeder.
Figure 12:
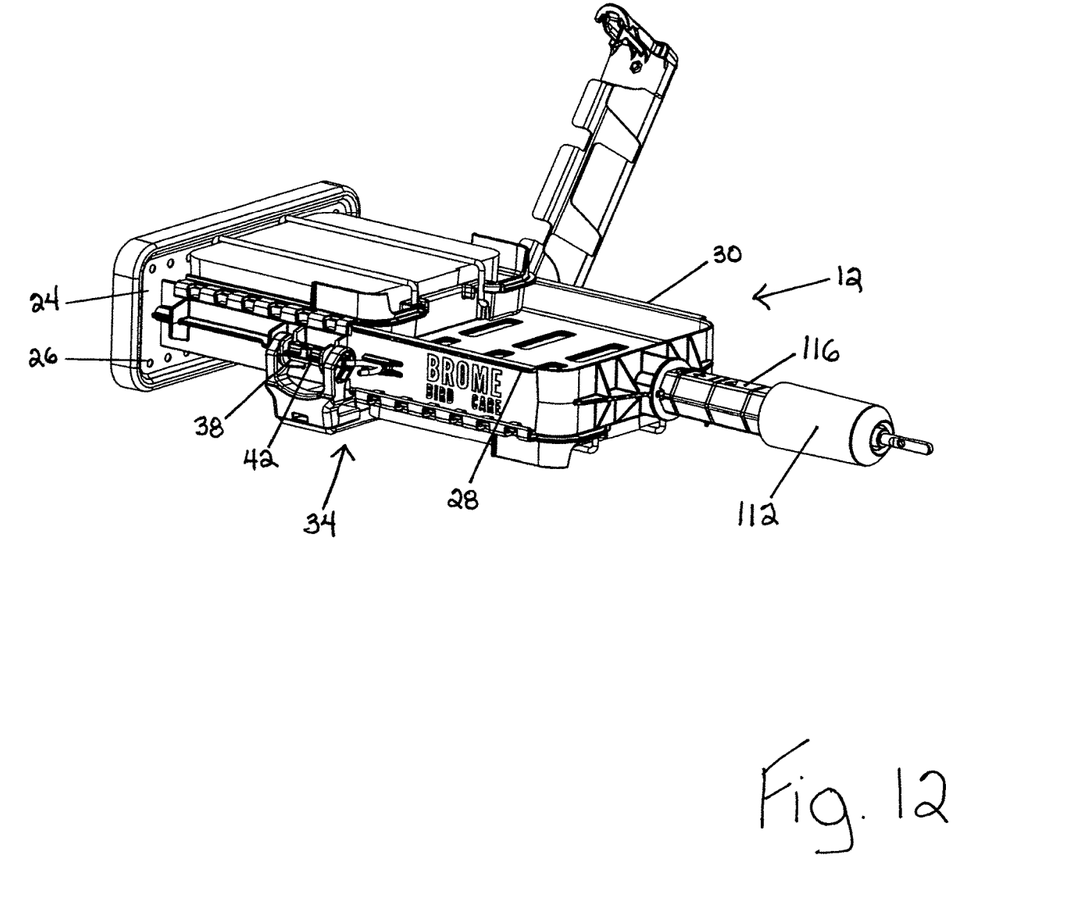
FIG. 12 is a perspective view illustrating placement of the suet pack in the feeder.

As may be seen in FIG. 11, a suet pack 76 may be placed on tray 60. Typically, suet pack 76 will come in a metallic tray sealed with a plastic cover. In this instance, the suet pack may be inverted after removing the plastic cover and placed in tray 60 without touching the suet per se. Following this, a retainer generally designated by reference numeral 78 may be pivoted over suet pack 76 to retain it in tray 60. Retainer 78 is held in place by end wall catches 68. As shown, retainer 78 may be formed of a rod-like member bent into the required configuration.

Figure 13:
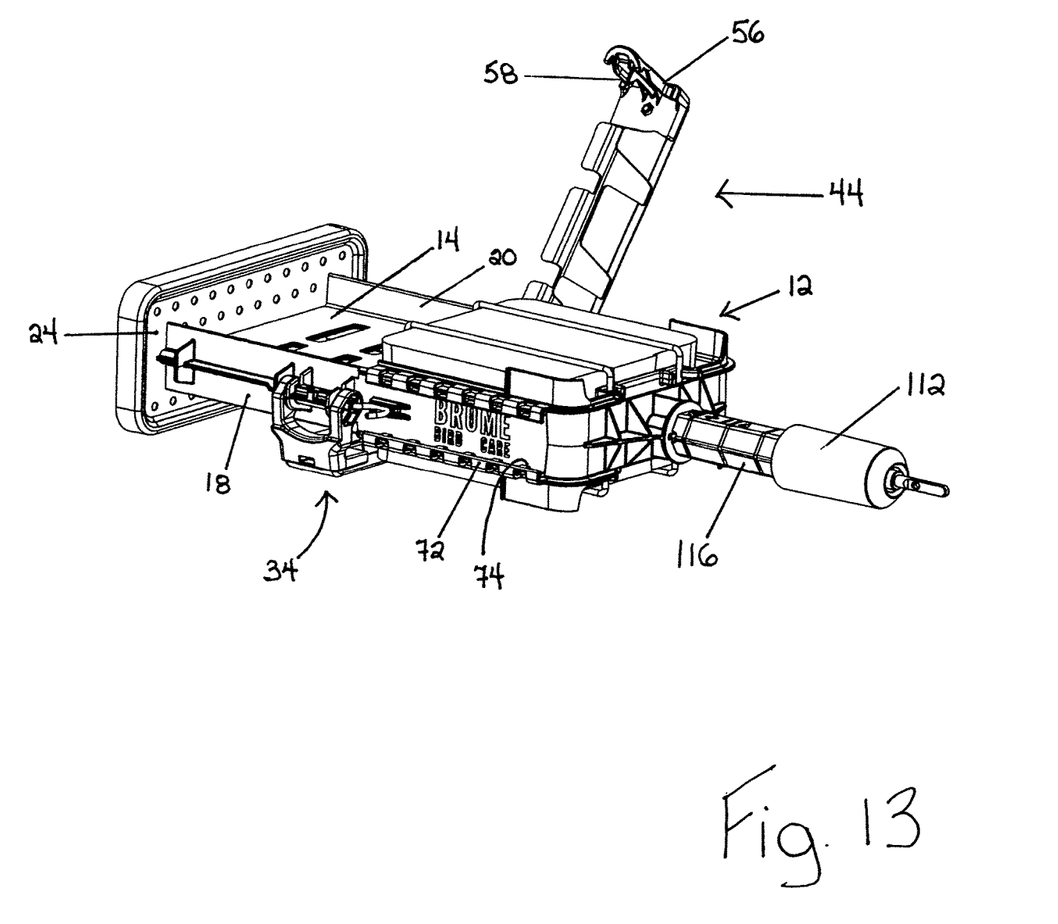
FIG. 13 illustrates movement of the suet pack to an upper position.
Figure 14:
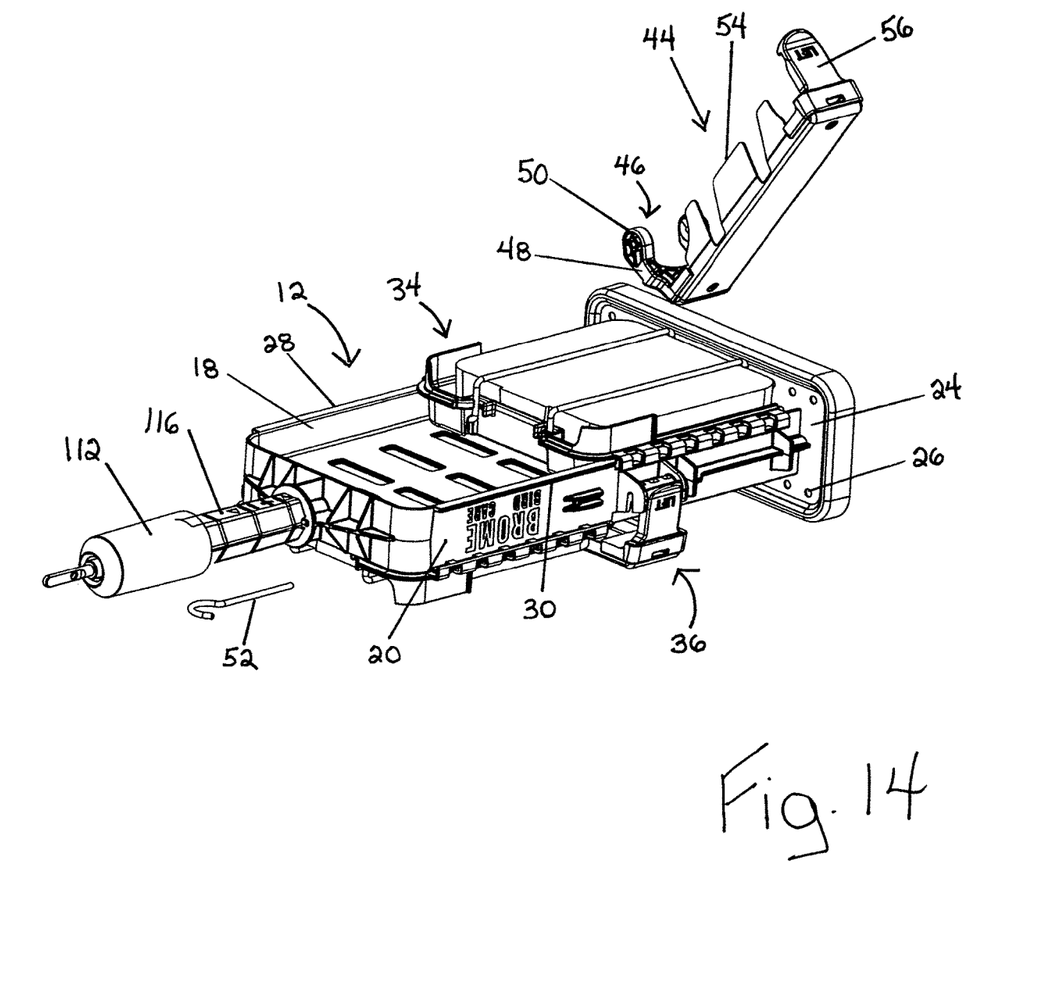
FIG. 14 is an exploded of the inner frame and suet retaining member.

Tray 60 may then be placed on center wall 14 of frame 12. Tray 60 may then be slid upwardly in the frame with the tray being retained by engagement of flanges 28, 30 with flange 70, side wall 72 and inwardly extending tabs 74. The suet pack is shown in this position in FIG. 13 following which suet support member 44 may be rotated to the closed position with catches 58 engaging center support 54.

As shown in the drawings, the same structure is utilized on both sides of center wall 14 such that two suet packs may be inserted in the suet feeder 10. However, it will be understood that one could utilize only a single suet pack if desired.

Standing about frame 12 is a shroud generally designated by reference numeral 86. Shroud 86 is formed of a plurality of horizontal wires 88 and vertical wires 90 secured together to form a type of mesh. Within shroud 86, there is provided a feed access opening generally designated by reference numeral 92. Located about feed access opening 92 is a relatively closed area 94 which may be formed of solid material having apertures therein. Sitting on top of shroud 86 is a cover 96 which is secured thereto.

A shaft 98 extends through spacer 32 and is secured in position by means of a nut 104 and a washer 102 on the bottom thereof and a nut 106 and washer 108 on the top thereof. Shaft 98 has threads 100 formed on a lower section thereof.

An adjustment nut 110 is provided and forms a stop for the lower end of a spring 111 which extends about shaft 98. A cap member is mounted on top and forms an upper stop for spring 111. A protrusion 114 formed on shaft 98 retains cap 112 in position.

Surrounding nut 110 is a tension adjuster housing 116 which snugly engages nut 110 in which, upon rotation, will turn adjustment nut 110 which thereby adjusts the tension in spring 111. Preferably, tension adjuster housing 116 includes indicia 118 thereon providing instructions to the user to indicate in which direction to turn tension adjuster housing 116 in order to increase or lessen the tension. Preferably, tension adjuster housing 116 is transparent in the area surrounding adjustment nut 110 so that the location thereof may be seen.

As may be seen in the drawings, shroud 86 rests on top of cap 112 such that when a squirrel or other marauder climbs on the shroud 86, shroud 86 will move downwardly so that relatively closed area 94 surrounds the suet pack 76 denying access thereto. Under normal circumstances, feed access opening 92 permits access by the birds to the lower end of suet pack 76.

Once a lower portion of suet pack 76 is consumed, suet tray 60 is free to slide downwardly and thus present fresh suet to the feed access opening.

The suet feeder may include a hanger generally designated by reference numeral 120 with a negative grip tube 122 extending thereabout. This arrangement is known in the art and reference may be had to U.S. Pat. No. 7,739,982 issued Jun. 22, 2010 to Paul L. Cote.

It will be understood that the above described embodiment is for purposes of illustration only and changes and modifications may be made thereto without departing from the spirit and scope of the invention.

I claim:

1. A suet feeder comprising:
   an inner frame;
   a suet tray sized to receive a suet pack, said suet tray being slidably mounted on said inner frame;
   a suet support member mounted on said inner frame, said suet tray being slidable past said suet support member; and
   a shroud extending over said inner frame and said suet tray and suet support member, said shroud having a wall extending over said inner frame, said suet tray and said suet support member, said wall having a feed opening therein, a relatively closed area of said shroud being located above said feed opening, which relatively closed area denies access to the suet pack, said feed opening being located proximate an upper portion of said suet support member such that access may be had to a lower portion of the suet pack when placed on said suet support member, wherein once the lower portion of the suet pack is consumed, the suet tray is free to slide past the suet support member to allow access to an upper portion of the suet pack.

2. The suet feeder of claim 1 further including a spring biasing said shroud upwardly with respect to said inner frame and suet tray, said spring being arranged such that said suet access opening is sufficiently aligned with said suet support member to permit access to said suet tray, said shroud being movable between an open position permitting access to suet in said suet tray and a closed position wherein access to said suet tray is denied, said relatively closed area of said shroud being sufficiently solid to prevent a squirrel from having access to said suet tray.

3. The suet feeder of claim 2 further including a cover secured to said shroud.

4. The suet feeder of claim 3 further including a rod connected to a top of said frame, screwthreads being formed on a lower portion of said rod, a spring extending about said rod;
  an upper member extending about an upper portion of said rod, said upper member forming a stop for an upper end of said spring;
  a nut screwthreadably engaged with said lower portion of said rod, said nut forming a stop for a lower end of said spring;
  said shroud being mounted on said upper member to thereby exert a compressive force on said spring.

5. The suet feeder of claim 4 wherein said cover is connected to said shroud.

6. The suet feeder of claim 4 further including a suet retaining member hingedly attached to said suet tray, said suet retaining member being movable into and out of a suet retaining position.

7. The suet feeder of claim 6 wherein said suet retaining member is formed as a rod structure.

8. The suet feeder of claim 4 wherein said suet tray is mounted on a first side of said inner frame, a second suet tray being mounted on a second side of said inner frame.

9. The suet feeder of claim 8 wherein said shroud encloses said suet support member and said suet trays.

10. The suet feeder of claim 4 further including a transparent covering about said nut to enable visual access to said nut.

11. The suet feeder of claim 10 wherein said transparent covering engages with said nut to enable adjustment of said nut and thereby adjust tension of said spring.

12. The suet feeder of claim 1 wherein said suet support member is pivotably connected to a side of said inner frame.

13. The suet feeder of claim 1 wherein, said suet support member is removably connected to a side of said inner frame.

* * * * *